United States Patent [19]

Russell

[11] Patent Number: 5,119,768
[45] Date of Patent: Jun. 9, 1992

[54] PETROLEUM AND HYDROGEN DRIVEN ENGINE

[76] Inventor: Carl D. Russell, P.O. Box 334, Sallisaw, Okla. 74955

[21] Appl. No.: 596,878

[22] Filed: Oct. 12, 1990

[51] Int. Cl.[5] .................... F02M 25/07; F02M 21/02; F02B 43/12
[52] U.S. Cl. ...................... 123/1 A; 123/3; 123/DIG. 12
[58] Field of Search ............... 123/14, 3, 59 EC, 575, 123/DIG. 12

[56] References Cited

U.S. PATENT DOCUMENTS

| | | | |
|---|---|---|---|
| 3,861,367 | 1/1975 | Kelmar | 123/1 A X |
| 3,939,806 | 2/1976 | Bradley | 123/DIG. 12 X |
| 4,041,910 | 8/1977 | Houseman | 123/59 EC |
| 4,131,095 | 12/1978 | Ouchi | 123/3 X |
| 4,380,970 | 4/1983 | Davis | 123/DIG. 12 X |
| 4,442,801 | 4/1984 | Glynn et al. | 123/DIG. 12 X |

FOREIGN PATENT DOCUMENTS

| | | | |
|---|---|---|---|
| 2340450 | 9/1977 | France | 123/1 A |
| 51913 | 3/1982 | Japan | 123/1 A |

Primary Examiner—Tony M. Argenbright

[57] ABSTRACT

This invention will place less demand on petroleum fuel used in a combustion engine by recycling the exhaust gases, primarily carbon monoxide, used as a reducing agent when combined with hydrogen from the on-board hydrogen generator and will produce a cooler and much less polluting exhaust. The operating cost of a combustion engine will be drastically reduced with much higher performance.

20 Claims, 1 Drawing Sheet

PETROLEUM AND HYDROGEN DRIVEN ENGINE

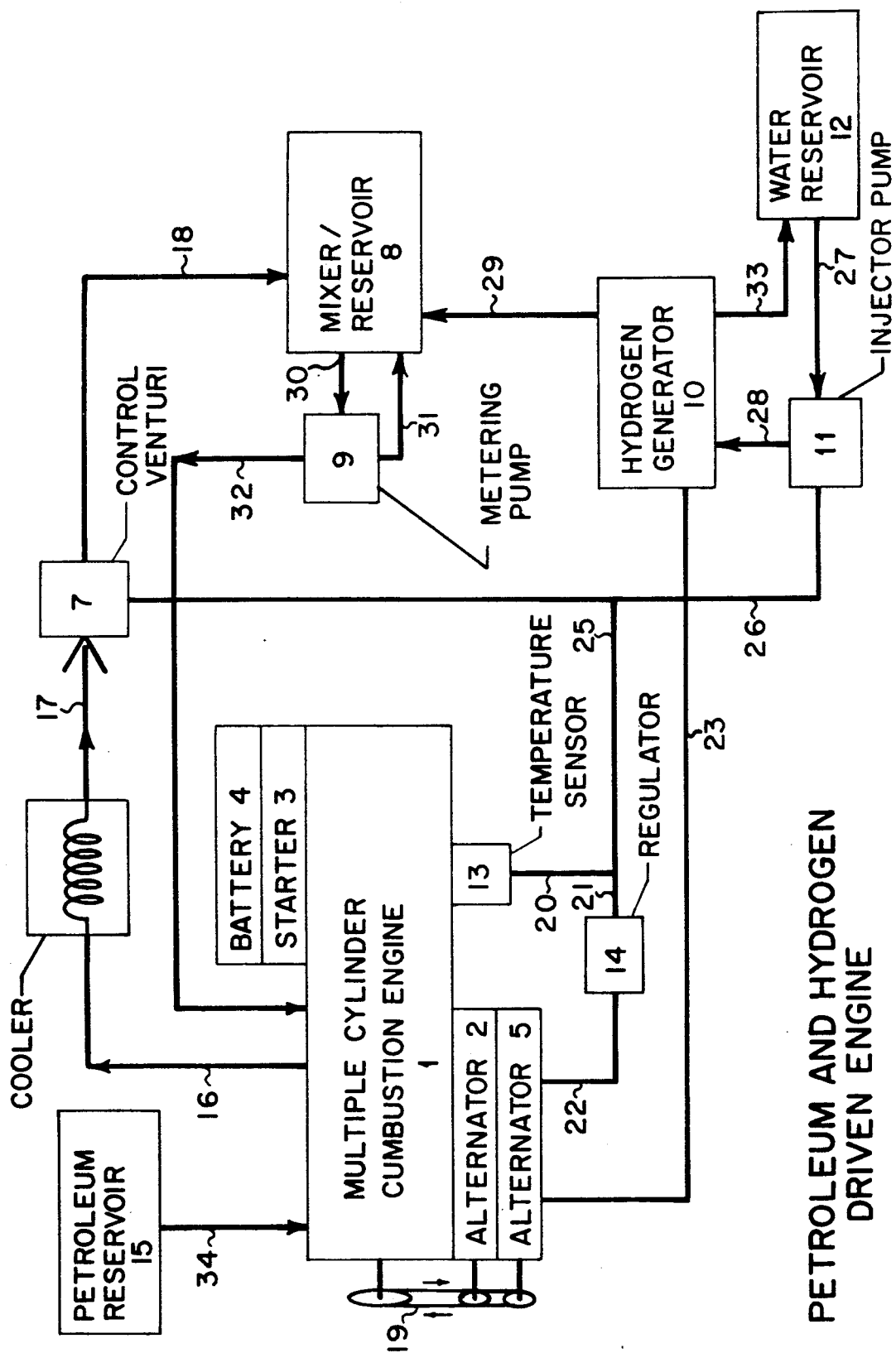

PETROLEUM AND HYDROGEN DRIVEN ENGINE

FIELD OF THE INVENTION

The on-board electrolysis hydrogen generator, using iron cathodes and nickel anodes and water containing small concentration of sodium hydroxide, will yield hydrogen. Petroleum fuel combustion engines produce primarily carbon monoxide exhaust and as an impurity is not a detrimental gaseous reducing agent for hydrogen. The combination of these elements enable the combustion engine to operate without damaging the engine. The small amount of hydrogen is produced and used only when the engine is in operation.

THE BACKGROUND OF THE INVENTION

The use of pure hydrogen as a fuel in a combustion engine causes sever heat metal damage. Also, transporting of bulk hydrogen presents safety hazards.

BRIEF DESCRIPTION OF THE DRAWING

The sole FIGURE is a schematic diagram of the present invention.

OPERATION

The multiple cylinder combustion engine 1 is split into two (2) units. The first unit is powered by petroleum fuel and the second unit is powered by mixture of exhaust gases from the petroleum powered cylinders, air and hydrogen. The intake and exhaust manifolds are split respectfully between the petroleum and hydrogen cylinders. The petroleum cylinders are cranked by starter 3, powered by battery 4 and ignited. The exhaust gases from the petroleum fuel cylinders are expelled through conduit 16 into cooler 6 then through conduit 17 to control venturi 7 and are mixed with air. The amount of air is controlled by the temperature sensor 13 mounted in the exhaust manifold of the hydrogen powered cylinders. The exhaust gases and air mixture is then passed through conduit 18 and collected in the mixer/reservoir 8.

Alternator 5 being rotated by the petroleum fueled portion of engine 1 via belt 19 and is biased by temperature sensor 13 via conductor 20, 21, regulator 14 and conductor 22. Alternator 5 output via conductor 23 provides electrical power to hydrogen generator 10. Injector pump 11 is controlled by temperature sensor 13 via conductor 20, 25 and 26 and pumps water from water reservoir 12 through conduit 27 and 28 into hydrogen generator 10. The hydrogen produced is transported through conduit 29 into mixer/reservoir 8. The residue from the hydrogen generator 8 is discarded through conduit 33.

The mixer/reservoir 8 is now charged with the exhaust gases, air and hydrogen mixture. Conduit 30 provides this mixture to metering pump 9 and is injected through conduit 32 into the hydrogen cylinders. At this time all cylinders are ignited and producing power.

Alternator 2 charges battery 4 to maintain starting and other engine basic functions.

What is claimed is:

1. An apparatus comprising:
    a combustion engine having a plurality of cylinders, a first portion of said cylinders being operable for burning a hydrocarbon fuel to produce an exhaust gas and a second portion of said cylinders being operable for burning hydrogen;
    a hydrogen supply means for supplying said hydrogen;
    a cooling means for cooling at least a portion of said exhaust gas to provide a cooled exhaust gas stream;
    a delivering means for delivering said hydrogen and said cooled exhaust gas stream to said second portion of said cylinders.
2. The apparatus of claim 1 further comprising admixing means, disposed within said delivering means, for admixing said cooled exhaust gas stream with a free oxygen source and with said hydrogen.
3. The apparatus of claim 2 wherein said free oxygen source is air.
4. The apparatus of claim 1 wherein:
    said first portion of said cylinders consists of at least one of said cylinders and
    said second portion of said cylinders consists of the remainder of said cylinders.
5. The apparatus of claim 1 wherein said hydrogen supply means comprises a means for producing hydrogen from water.
6. The apparatus of claim 1 wherein said hydrogen supply means comprises an electrolysis means for electrolytically producing hydrogen from water using an electrical current.
7. The apparatus of claim 6 wherein:
    said apparatus further comprises an electrical current generating means for generating at least a portion of said electrical current;
    said apparatus further comprises conducting means for conducting said portion of said electrical current from said electrical current generating means to said electrolysis means; and
    said combustion engine is drivingly associatable with said electrical current generating means such that the operation of said combustion engine will cause said electrical current generating means to generate said portion of said electrical current.
8. The apparatus of claim 1 wherein said delivering means comprises a metering pump.
9. An apparatus comprising:
    a combustion engine having a plurality of cylinders, a first portion of said cylinders being operable for burning a hydrocarbon fuel to produce an exhaust gas and a second portion of said cylinders being operable for burning hydrogen;
    a cooling means for cooling at least a portion of said exhaust gas to provide a cooled exhaust gas stream;
    an electrolysis means for electrolytically producing said hydrogen from water using an electrical current;
    a delivering means for delivering said cooled exhaust gas stream and said hydrogen to said second portion of said cylinders;
    admixing means, disposed within said delivering means, for admixing said cooled exhaust gas stream with air and with said hydrogen;
    an electrical current generating means for generating at least a portion of said electrical current; and
    conducting means for conducting said portion of said electrical current from said electrical current generating means to said electrolysis means,
    said combustion engine being drivingly associatable with said electrical current generating means such that the operation of said combustion engine will cause said electrical current generating means to generate said portion of said electrical current.

10. The apparatus of claim 9 wherein:
said first portion of said cylinders consists of at least one of said cylinders and
said second portion of said cylinders consists of the remainder of said cylinders.

11. A method of operating a combustion engine, said combustion engine having a plurality of cylinders, comprising the steps of:
(a) combusting a hydrocarbon fuel in a first portion of said cylinders whereby an exhaust gas is produced;
(b) cooling at least a portion of said exhaust gas to provide a cooled exhaust gas stream; and
(c) combusting a mixture comprising said cooled exhaust gas stream, hydrogen, and oxygen in a second portion of said cylinders.

12. The method of claim 11 wherein said first portion of said cylinders consists of at least one of said cylinders and said second portion of said cylinders consists of the remainder of said cylinders.

13. The method of claim 11 wherein said exhaust gas produced in step (a) comprises carbon monoxide.

14. The method of claim 11 further comprising the step of generating said hydrogen from water by electrolysis using an electrical current.

15. The method of claim 14 further comprising the step of generating at least a portion of said electrical current using an electrical current generating means which is driven by said combustion engine.

16. The method of claim 11 further comprising the steps of:

admixing said cooled exhaust gas stream with air and with said hydrogen to form an exhaust gas/air/hydrogen mixture and
delivering said exhaust gas/air/hydrogen mixture to said second portion of said cylinders for combustion in accordance with step (c).

17. A method of operating a combustion engine, said combustion engine having a plurality of cylinders, comprising the steps of:
(a) combusting a hydrocarbon fuel in a first portion of said cylinders whereby an exhaust gas is produced;
(b) generating hydrogen from water by electrolysis using an electrical current;
(c) generating at least a portion of said electrical current used in step (b) using an electrical current generating means which is driven by said combustion engine;
(d) admixing at least a portion of said exhaust gas with air and with said hydrogen to form an exhaust gas/air/hydrogen mixture; and
(e) combusting said exhaust gas/air/hydrogen mixture in a second portion of said cylinders.

18. The method of claim 17 wherein said first portion of said cylinders consists of at least one of said cylinders and said second portion of said cylinders consists of the remainder of said cylinders.

19. The method of claim 18 further comprising the step, prior to step (d), of cooling said portion of said exhaust gas.

20. The method of claim 19 wherein said exhaust gas produced in step (a) comprises carbon monoxide.

* * * * *